United States Patent [19]

Highland et al.

[11] Patent Number: 5,119,470
[45] Date of Patent: Jun. 2, 1992

[54] COMPUTER BASED INFERENCE ENGINE DEVICE AND METHOD THEREOF FOR INTEGRATING BACKWARD CHAINING AND FORWARD CHAINING REASONING

[75] Inventors: Frederic D. Highland, New Midway; Christine T. Iwaskiw, Ellicott City; James D. Tani, Chevy Chase, all of Md.; Hugh W. Gallivan, Champaign, Ill.

[73] Assignee: IBM Corporation, Armonk, N.Y.

[21] Appl. No.: 515,720

[22] Filed: Apr. 27, 1990

[51] Int. Cl.⁵ .............................................. G06F 15/18
[52] U.S. Cl. ......................................... 395/64; 395/52
[58] Field of Search ........................................... 395/64

[56] References Cited

U.S. PATENT DOCUMENTS

| | | | |
|---|---|---|---|
| 4,763,277 | 8/1988 | Ashford et al. | 364/900 |
| 4,809,347 | 2/1989 | Nash et al. | 364/133 |
| 4,903,215 | 2/1990 | Masuishi et al. | 364/513 |
| 4,924,408 | 5/1990 | Highland | 364/513 |
| 4,928,236 | 5/1990 | Tanaka et al. | 364/188 |
| 4,931,933 | 6/1990 | Chen et al. | 364/513 |
| 4,931,951 | 6/1990 | Murai et al. | 364/513 |
| 4,941,102 | 7/1990 | Darnell et al. | 364/513 |
| 4,970,657 | 11/1990 | Wolf | 364/513 |
| 4,970,658 | 11/1990 | Durbine et al. | 364/513 |
| 4,975,865 | 12/1990 | Carrette et al. | 364/139 |

OTHER PUBLICATIONS

W. F. Clocksin et al., *Programming in Prolog*, Third Edition, Springer-Verlag Berlin Heidelberg 1987.
W. Van Melle et al., *The Emycin Manual* Department of Computer Science, Stanford University, Oct. 1981.

*Primary Examiner*—Michael R. Fleming
*Assistant Examiner*—George Davis
*Attorney, Agent, or Firm*—Sterne, Kessler, Godlstein & Fox

[57] ABSTRACT

An inference engine device adapted for use in a computer-controlled expert system, the computer-controlled expert system having a computer and a knowledge base of objects and rules, the objects having known values and unknown values, the rules having at least one test against an object or objects and configured in a Rete based network. The inference engine is comprised of a first module with a function of storing instructions for the computer; a second module, associated with the first module, that is comprised of a function for instructing the computer to perform forward reasoning with the objects having known values and another function for generating a conflict set; a third module, associated with the first module, that has a function of instructing the computer to perform backward reasoning about the objects having unknown values; and a fourth module, associated with the first module, that determines whether the first or second module is being executed by the computer.

18 Claims, 12 Drawing Sheets

COMPUTER BASED INFERENCE ENGINE DEVICE AND METHOD THEREOF FOR INTEGRATING BACKWARD CHAINING AND FORWARD CHAINING REASONING

BACKGROUND OF THE INVENTION

1. Field of the Invention

The present invention relates very broadly to computers, and generally to an inference engine used in knowledge base development shells and knowledge based application programs (expert systems). The present invention relates more particularly to an inference engine device and method thereof that integrates backward chaining with Rete based forward chaining.

2. Related Art

Knowledge based application programs (expert systems) generally comprise a knowledge base and an inference engine. The inference engine is that part of the system that "reasons." Two inferencing strategies that have been employed by expert systems are backward chaining and forward chaining.

Backward chaining was one of the first inferencing strategies used in expert systems. Backward chaining has proven its usefulness for classification problem solving. Backward chaining is also one of the first clearly-defined inferencing strategies to be used in reusable expert system shells. One such expert system is known as MYCIN. The MYCIN system is fully explained in Van Melle, W., Scott, A. C., Bennet, J. S., Peairs, M. A. *The EMYCIN Manual.* Heuristic Programming Project Report HPP-81-16. Stanford University. 1981. This reference is hereby incorporated by reference into this specification in its entirety.

Systems of the type exemplified by MYCIN, use backward chaining to focus processing along a single line of reasoning towards a goal selected by the system. Its power as a general inferencing strategy soon became apparent, and was implemented as the primary inferencing strategy in such expert system development shells as EMYCIN, S.1, and Expert Systems Environment. An expert system development shell is a system that allows a user to build a wide variety of expert systems.

Backward chaining is a depth-first search strategy of decision tree traversal. Because it is depth-first, it has the primary characteristic of focusing inferencing along reasoning paths until an answer is reached.

Its focused inferencing has a number of side benefits. First, questions seem to be asked in a logical order, indicating to the user that the system is working towards a goal along a specific path of reasoning. Second, backward chaining inherently provides a convenient way of producing both the current line of reasoning that the system is pursuing and the line of reasoning that caused a particular value to be concluded.

Classical backward chaining generally operates as follows:

Given a Goal (an object for which a value is desired),
1. Collect all of the rules that can be activated (not already false) and if activated will provide the desired object value;
2. Select a rule from the collection of relevant rules (based on some selection criteria); and
3. If object values are needed to activate the rule then make the next needed object the new goal and start the above process over. Otherwise, activate the rule.

Often as a function of step 1, conventional systems will ask the user to provide the value of the object as an alternative to pursuing rules to get the value.

Another form of backward chaining is that performed by a PROLOG based system. The PROLOG system is fully explained in Clocksin, W. F. and C. S. Mellish, *Programming in Prolog.* Berlin: Springer-Verlag. 1984. This reference is hereby incorporated by reference in its entirety into this specification.

PROLOG is in essence a complete programing language based on resolution theorem proving. In PROLOG predicates are searched that match the pattern established as the current goal.

There are two apparent differences between PROLOG's backward chaining and classical backward chaining. First, PROLOG may establish as a goal the acquisition of either any value or a specific value. This is opposed to classical backward chaining where any value will accomplish the goal. Second, PROLOG has a feature called backtracking, that allows predicates established as part of the backward chaining process to be retracted if the search path leads to a dead end. This is a significant feature of PROLOG.

While backward chaining has proven to be a simple and easy to use inferencing method, it is not ideal for all problem types. Problems for which the solution must be synthesized from available data, such as monitoring, scheduling, and design problems are difficult to perform with backward chaining. Problems which require the monitoring of constantly changing data can be difficult or inefficient to solve with a backward chaining paradigm or approach. These types of problems can often be easily solved with a forward chaining approach, especially that based on the Rete pattern matching algorithm. The Rete pattern matching algorithm is well known in the art. The Rete pattern matching algorithm is fully explained in Forgy, C. L. "Rete: A Fast Algorithm for the Many Pattern/Many Object Match Problem", *Artificial Intelligence,* 1982. This reference is hereby incorporated by reference in its entirety into this specification.

In addition, as expert system applications are moved from the realms of research and novelty applications to serious deployable applications, emphasis has shifted towards performance and embedability. Embedability means the ability of the expert system to be embedded (sub-component) of a standard application program.

To meet these demands, forward chaining has become the inferencing strategy of choice in many applications. Forward chaining has the ability to deal with a non-monotonic and changing fact base, and operate with high performance (using, for example, a Rete network to store partial inferences). As applications have become tightly integrated with existing systems, asking questions of the user has shifted to searching databases.

Such applications, however, do not eliminate the need for backward chaining. Tight focusing on particular reasoning paths is still valuable for certain diagnostic applications among others. It is still beneficial to ask users questions in an intelligent manner, even if such questions are less frequent. In addition, the highly focused reasoning of backward chaining can be more efficient than forward chaining for some applications.

Most real world problems are not of a single problem type, but are a collection of sub-problems. Thus, many of these problems require a mixture of paradigms or inferencing approaches in order to solve the sub-problems. In addition, a mixture of both paradigms in a tightly coupled approach, sometimes called mixed chaining or opportunistic reasoning, is needed for some problems.

OBJECTS OF THE INVENTION

One object of the present invention was to develop a computer-based generic inferencing scheme that integrates Rete based forward chaining with backward chaining in such a way as to allow the system developer to apply either a forward chaining or backward chaining strategy to solve a given problem.

Another object of the present invention was to develop a computer-based inference engine and method thereof that would perform forward chaining whenever possible.

An additional object of the present invention was to use the same knowledge base of rules as a source for both forward chaining and backward chaining reasoning.

Another object of the present invention was to develop an inference engine and method that would selectively distribute objects to the relevant rule in a Rete network only in response to backward reasoning.

Another object of the present invention was to develop an inference engine and method that would distribute objects to the entire Rete network in response to backward reasoning.

Still another object of the present invention was to develop an inference engine and method thereof that could reason about rules in either a forward or backward chaining manner.

Yet another object of the present invention was to develop an inference engine and method thereof that could perform opportunistic reasoning.

These and other objects achieved by the present invention.

SUMMARY OF THE INVENTION

The present invention is a computer-based device and method which provides advantages heretofore unavailable in conventional inference engines used in computer-based expert systems and expert system development shells.

The present invention can be integrated into a computer-based expert system and method to perform problem solving using both forward and backward chaining reasoning. Moreover, the present invention allows the expert system developer to apply each inferencing technique (forward and/or backward chaining) towards solving any aspect of a problem that is most appropriate for it.

The present invention augments the computer-based Rete network so that backward chaining can be implemented in an integrated fashion with Rete based forward chaining. The present invention augments the Rete network so that when an object is distributed to the Rete network and no match occurs, the object and associated rules are removed from the inferencing process. This augmentation allows the present invention to preserve the high performance of a Rete based forward chaining network.

The inference engine device and method of the present invention can take the form of an encoded floppy disk or an encoded magnetic tape. The inference engine of the present invention could also take the form of integrated circuitry embedded in a Read Only Memory Device (ROM).

The inference engine of the present invention performs, among other things, the following operations:
1. Perform matching of the rules against the data known to the system creating in the conflict set a rule instance for each rule and a set of data that meets the rule's conditions;
2. Perform conflict resolution on the rule instances in the conflict set until no rule instances are left;
3. Commence backward chaining when the conflict set is empty by selecting an available goal;
4. Initial goal expansion using backward chaining if the goals have been established;
5. Distribute backward chaining data through the Rete network as goals are expanded (rule instances may appear in the conflict set);
6. Resume forward chaining if the rule instances appear in conflict set, and continue such forward chaining until conflict set is empty;
7. Resume backward chaining when the conflict set is empty; and/or
8. Return control to the software calling (controlling or commanding) the knowledge base when both the conflict set is empty and there are no more goals to pursue.

As discussed above, the inference engine of the present invention generally begins reasoning on a knowledge base by matching rules to data performing conflict resolution on the rule instances in the conflict set until no rule instances are left. When the conflict set is empty, the inference engine of the present invention initiates backward chaining reasoning.

If goals have been established, then backward chaining initiates goal expansion (1) to locate a rule(s) that would, if fired, provide the value for the object and/or (2) to interact with the user of other software to obtain a value for the object. As goals are expanded and backward chaining data is selectively distributed through the Rete network, rule instances may appear in the conflict set.

When the inference engine of the present invention detects that rule instances exist in the conflict set, it suspends backward chaining and initiates forward chaining. The inference engine of the present invention continues forward chaining reasoning until the conflict set is empty. Thereafter, the inference engine of the present invention resumes backward chaining.

When the inference engine of the present invention detects that both the conflict set is empty and there are no more goals to pursue, it returns control to the software calling the knowledge base (either user-supplied software in an embedded mode, or via the environment interface in a standalone mode).

BRIEF DESCRIPTION OF THE DRAWINGS

Various aspects, features and attendant advantages of the present invention as defined by the claims are better appreciated from the following detailed description of the present invention. The detail description makes reference to the accompanying drawings, in which:

DETAILED DESCRIPTION OF THE PREFERRED EMBODIMENT

The present invention is an inference engine device and method that can be integrated into a computer-based expert system to perform forward and backward chaining reasoning. The inference engine of the present invention can also be integrated into a computer-based expert system development shell so that the above described expert system can be built. The present invention provides advantages heretofore unavailable in conventional computer-based inference engines. It should be understood that the inference engine of the present invention is in all respects a separate and distinct electrical (or computer) component that is integrated as a sub-component into other computer-based systems.

The inference engine of the present invention allows the mixing of forward and backward chaining reasoning about a knowledge base. This forward and backward reasoning is termed mixed chaining (or chain) reasoning in this application. As disclosed, there are three embodiments of mixed chaining reasoning in the present invention.

In the first embodiment, the inference engine of the present invention is adapted to perform reasoning about rules that are strictly specified for forward or backward chaining reasoning within the same knowledge base. In the second embodiment, the inference engine is adapted to perform reasoning about rules that specify both forward and backward chaining reasoning about conditions. In the third embodiment, the inference engine is adapted to perform reasoning about rules which have both forward and backward chaining characteristics for the same condition, but allow forward chaining rules to fire when true independently of the focus of backward chaining reasoning.

Figure 1:
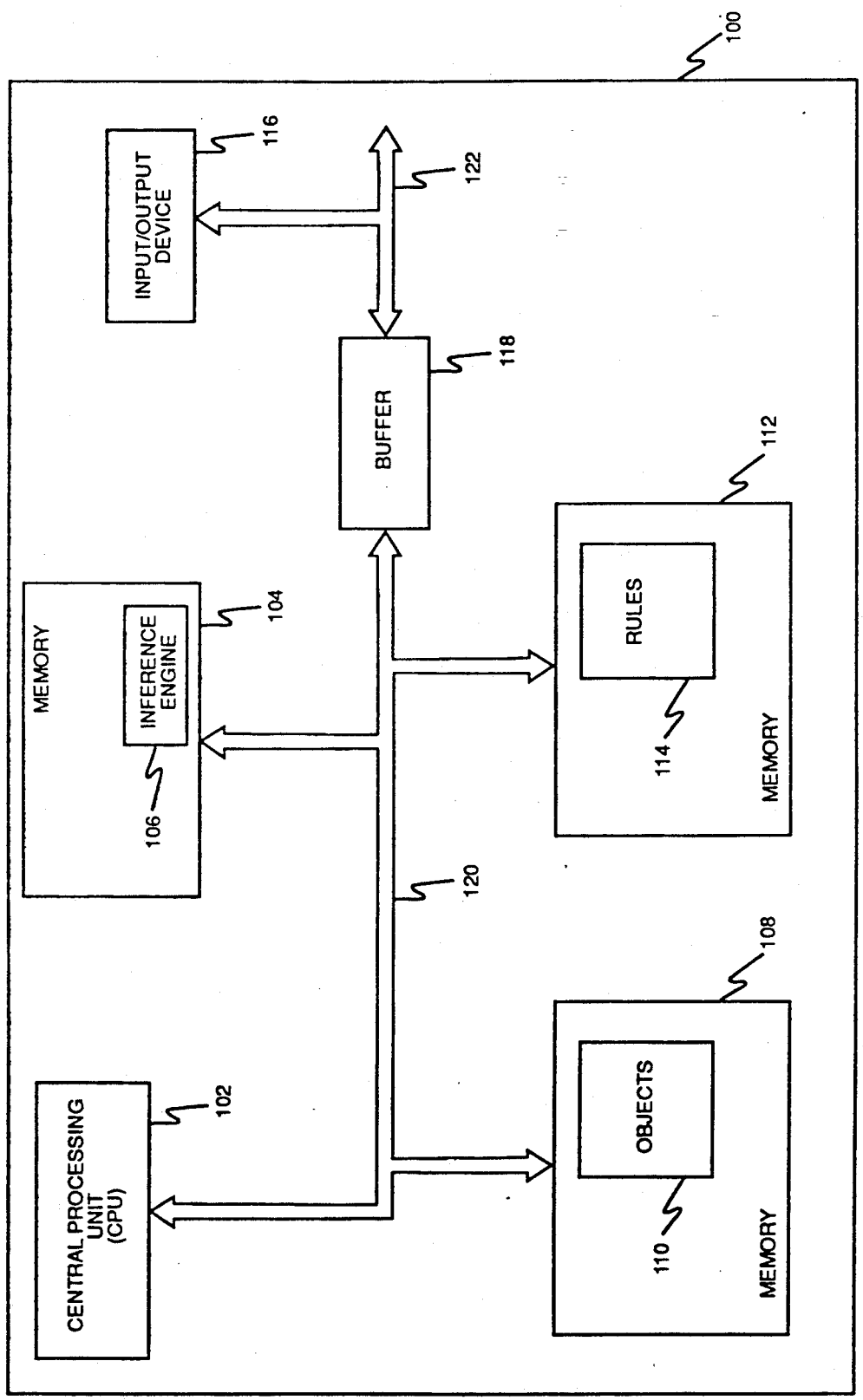
FIG. 1 is a high level block diagram showing the computer environment system of the inference engine of the present invention.

Turning now to FIG. 1, shown is a block diagram of the general computer-based environment in which the inference engine of the present invention resides and operates. The inference engine device of the present invention is designated generally by reference numeral 106. A computer environment (system) 100 of the inference engine device 106 generally comprises a central processing unit (CPU) 102, a first memory unit 104 for storing inference engine device 106, a second memory module 108 for storing an object file 110, and a third memory 112 for storing a rule file 114. CPU 102, first memory device 104, second memory device 108, and third memory device 112 communicate via a host bus 120. Computer system (environment) 100 of the present invention further comprises an input/output (I/O) device 116, and a buffer 118. CPU 102 communicates with I/O device 116 via system bus 122 and buffer 118. It should be understood that object file 110 and rule file 114 generally comprise a knowledge base 150 (not shown) of an expert system about which inference engine device 106 reasons.

It should be understood that the computer components/subsystems which make up computer system 100 are of conventional design. Any suitable presently available or future developed computer components/sub-systems can be used.

A preferred embodiment of computer system 100 is shown in FIG. 1. The preferred embodiment of computer system 100 is that of an IBM PS/2-OS/2 (IBM, PS/2, and OS/2 are registered trademarks of International Business Machines Corporation) based workstation environment.

It should be understood, however, that inference engine device 106 of the present invention can be readily integrated into other computer environments. Such other environments, include, but are not limited to, an IBM RT computer workstation running an AIX operating system (RT and AIX are registered trademarks of International Business Machines Corporation) or an IBM MVS or VM/CMS based main frame computer system.

Figure 2:
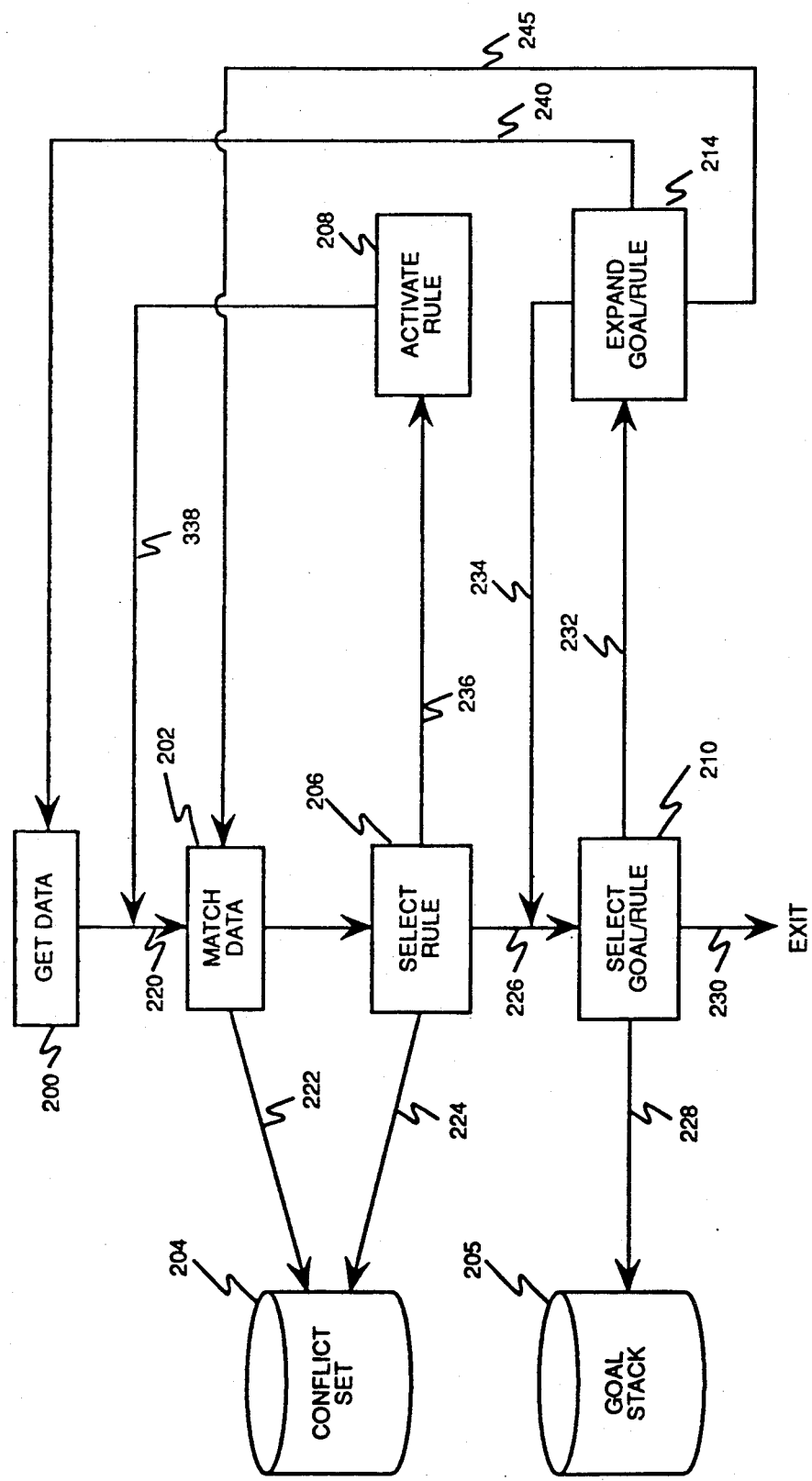
FIG. 2 is a high level flow chart showing the high level operation of the inference engine of the present invention.

FIG. 2 shows a high level flow chart of the method and operation of inference engine device 106 of the present invention. This high level flow chart is generic to all three embodiments of the present invention.

As shown by 200, the inference engine device 106 starts by obtaining values for objects from users or other software. For example, such other software may include, but is not limited to, a computer-based algorithm or program for calculating values for objects such as the date (value) for a given day of the week (object). It should also be noted that objects will exist that already have defined values that were specified by the expert system developer.

As shown by block 202, inference engine device 106 then operates to match objects with rules. As a result of this matching process, a rule may test true. If a rule tests true, inference engine device 106 inserts the rule instance into a conflict set 204. A rule instance is a data structure set comprising the rule and the objects that make the rule premise true. Note that there may be several sets of objects that make the rule premise true.

As a result of this matching process, inference engine device 106 may detect that rule instances exist in the conflict set. As shown by block 206, if inference engine device 106 detects that rule instances exist in the conflict set, inference engine device 106 then selects a rule to fire based on some selection criteria (described below).

As indicated by block 208, inference engine device 106 then activates (fires) the selected rule. The activation or firing of a rule typically creates or updates objects, or establishes a backward chaining goal.

Inference engine device 106 performs the above forward reasoning cycle until inference engine device 106 detects that no rule instances exist in conflict set 204. The above operation represents the forward reasoning aspect of inference engine device 106.

If inference engine device 106 detects that no rule instances exist in the conflict set, it then initiates backward chaining reasoning. As indicated by blocks 210, inference engine device 106 examines a goal stack 205 (described below) and selects a goal or rule instance to be processed if one exists.

If inference engine device 106 detects that no entries exist in goal stack 205, inference engine 106 terminates operation of the expert system. If inference engine device 106 detects an entry exists in goal stack 205, it selects a goal or a rule based on some goal selection criteria (described below).

As indicated by a block 214, inference engine device 106 then operates to expand the selected goal. In the goal expansion mode, inference engine device 106 determines if rules exist in the knowledge base which, if fired, will provide a value for the selected goal. If inference engine device 106 determines that no rules exist which will, if fired, provide that goal, it then determines if it is proper to ask the user for the goal information. If a rule or rules exist, inference engine device 106 adds these rules to goal stack 205. As shown by an information path 234, control returns to block 210, where inference engine device 106 selects a rule.

As indicated by block 214, the selected rule undergoes rule expansion. In the rule expansion mode, inference engine device 106 examines the rule to determine the next object value needed by the rule. This object value becomes the new goal (subgoal). The subgoal is placed on goal stack 205.

An information path 245 indicates that as inference engine device 106 expands selected goals, the backward chaining data in the rule premise, if known, is selectively distributed through the Rete network. As is further discussed below, this is a significant feature of the present invention.

As indicated by block 202, selective distribution of objects may cause rule instances to appear in conflict set 204. If inference engine device 106 detects that rule(s) exist in the conflict set 204, it suspends backward chaining reasoning and initiates forward chaining reasoning. Inference engine device 106 continues forward chaining reasoning until conflict set 204 is empty again, at which time backward chaining is resumed.

If inference engine device 106 detects that both the conflict set 204 is empty and there are no more goals to pursue, it returns control to the software (not shown) calling the knowledge base.

As may be realized from the generalized discussion above, inference engine device 106 is an integrated inferencing scheme that allows an expert system to reason using backward chaining, forward chaining and a couple of forms of mixed chaining. As will become apparent, inference engine device 106 also allows the expert system developer to develop a wide variety of computer-based expert systems wherein each expert system may rely more heavily on various reasoning aspects of the inference engine.

The first embodiment of the present invention is now described. It should be understood that much of the discussion of the first embodiment is equally applicable to the second and third embodiments of the present invention. As will become apparent, the reason for this is that the reasoning cycle of inference engine device 106 is very similar in each embodiment. Moreover, this similarity results in the preferred embodiment incorporating all three embodiments.

A. First Embodiment

In the first embodiment of the present invention, inference engine device 106 can reason about rules that reason in a forward chaining or backward chaining manner within the same knowledge base. A backward chaining rule is one which reasons about objects in a backward chaining manner in either its premise, or provides a value for an object that is reasoned about in a backward chaining manner.

As described below, in the first embodiment, inference engine device 106 allows forward chaining reasoning to take precedence over backward chaining reasoning. Rules are selected and fired from conflict set 204 until it is empty. Only when conflict set 204 is empty does backward chaining goal processing take place. If a backward chaining rule fires, backward chaining does not continue until conflict set 204 is empty.

Figure 3:
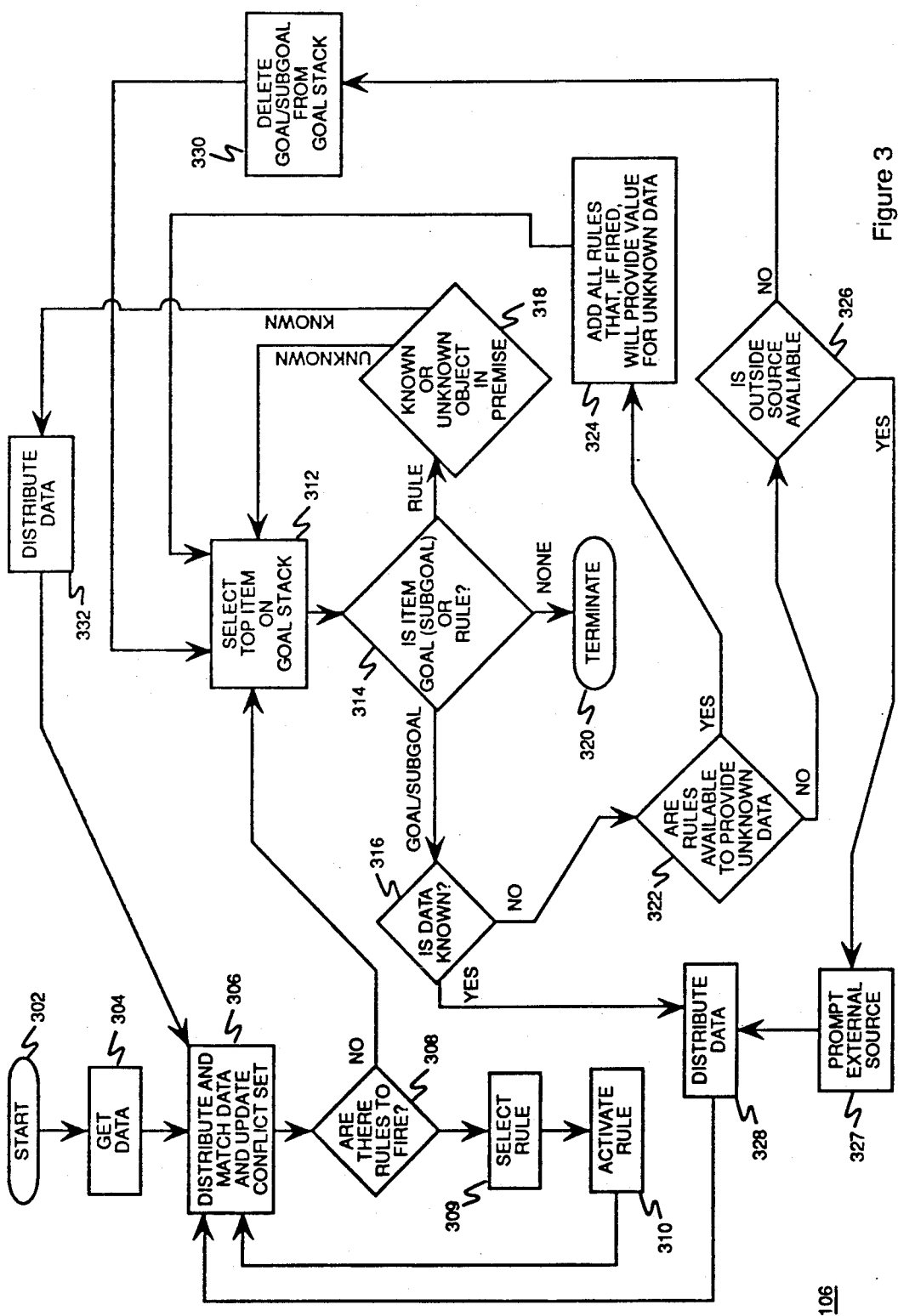
FIG. 3 is a more detailed flow chart showing the more detailed operation of the inference engine of the present invention.

FIG. 3 shows a more detailed flow chart of inference engine device 106. As shown by operational block 302, inference engine device 106 has means to detect when it is called for execution.

As indicated by an operational block 304, upon initialization, inference engine 106 instructs CPU 102 to gather data, if specified by the expert system developer, from a source external to the knowledge base. For example, if a forward chaining object is not defined with an initial value, but has a reference to an external data source, inference engine device 106 instructs CPU 102 to request the source at this time and distributes the value to the entire Rete network. Backward chaining data items that require sources for their values are not requested. Inference engine device 106 requests the source as necessary during backward chaining reasoning.

In the preferred embodiment, the external sources include include but are not limited to, the end user (not shown) who is using the expert system. The external source may also be an executable program.

Next shown is an operational block 306. Operational block 306 instructs CPU 102 to distribute data through the Rete network to rules that reason about the data in a forward chaining manner. The purpose of this operation is to generate partial matches. The computer-based Rete pattern matching algorithm is well known in the art of artificial intelligence and expert systems.

In the first embodiment, backward chaining objects are distributed only as needed and only to the associated rule and rule tests. In the first embodiment, rules only reason about objects in either a forward chaining or backward chaining manner. It should be clearly understood, and as described in the second embodiment, one test of a rule can reason about objects in a forward manner, while another test of the object can reason about a rule in a backward manner. This alternative embodiment is a significant feature of the present invention.

Forward chaining objects on the other hand, are distributed as soon as they are available. As a result of the matching process, a conflict set is generated if possible. The conflict set contains all rules and associated data items that are eligible to fire at any point in time.

As depicted by operational block 309, if inference engine device 106 detects that a rule instance exists in the conflict set, it then instructs CPU 102 to select a rule from the conflict set 204. Inference engine device 106 selects rules based on the following conflict resolution strategy (note that each criterion in the strategy operates on the selections of the previous criterion until a single rule instance has been selected):

1. Priority: select the rule instance with the highest priority.
2. Recency: select a rule instance with the most recently changed data bound to it. This is to focus processing on the most recent chain of reasoning.
3. Specificity: select a rule that is most specific. This is accomplished through two selection criteria:
   a. Select the rule instance with the most number of parameters and frame instances bound to it.
   b. Select the rule instance with the most number of conditions.

If, after the conflict resolution strategy is applied, there are still more than one rule instance selected, inference engine device 106 instructs CPU 102 to arbitrarily select one of the rules.

As depicted by operational block 310, once a rule instance has been selected, inference engine device 106 instructs CPU 102 to activate (fire) the selected rule. Activation of a rule may have the result of changing values for objects, asserting new objects, or retracting objects. These changes occur immediately, but are not distributed through the Rete network until the rule finishes firing. Distribution of these changes may cause rule instances to be removed from the conflict set (because their premises are no longer true) or added to the conflict set 204.

As is apparent, inference engine device 106 continues to fire rules until the conflict set 204 is empty. This series of executions represents the forward chaining aspect of inference engine device 106 of the present invention.

When inference engine device 106 detects that no rule instances are left in the conflict set 204, it performs backward chaining reasoning if necessary. As shown by operational block 312, upon detecting the non-existence of rule instances in the conflict set 204, inference engine device 106 processes the next item listed in what the present invention defines as a goal stack 205.

Generally, a goal stack 205 of the present invention is a single list (ordered sequence) that is created and stored in memory by inference engine device 106. As will be shown herein, inference engine device 106 uses the goal stack 205 as a "work area" to keep track of the state of backward chaining. Inference engine device 106 is constantly updating the goal stack 205. Items in the stack are either goals or rule instances.

A goal is an object for which a value is desired. Goals in the preferred embodiment are established by specifying them in a FIND action of a rule. In other words, upon initialization of the system, the rule is immediately fired, which creates a goal.

It should be understood, however, that other possible methods of specifying goals are contemplated by the present invention. These other methods include, but are not limited to, specifying them as part of the definition of the knowledge base by specifying whether an object is to be a goal or not, or prompting the user for the goal during execution of the computer system.

Once a set of goals are specified, the present invention inserts them individually into the goal stack 205 in reverse order so that they will be pursued. Then, through the process of goal expansion (to be discussed), the present invention pursues them, one at a time, until each goal has a value. Once all goals have values, goal processing concludes.

If goals are specified while another goal is being pursued, the current goal processing is suspended, and the new goals are pursued until they have values. Once they have values, goal processing continues with the previously pursued goal.

Rules in the goal stack 205 are rule instances selected from a goal pool (to be defined) which, if fired, provide the value for the goal. Inference engine device 106 prefers obtaining values for goals by putting rules on the stack as opposed to asking an external source. A Rule instance is removed from the goal stack 205 under one or more of the following conditions:

1. A bound data item is retracted;
2. The rule instance is fired;
3. The rule instance is selected, but cannot fire because its premise evaluates to false; and/or
4. The rule instance is selected, but cannot fire because its premise references forward chaining objects that do not exist.

When a rule instance is removed from the goal stack 205, all copies of it are removed from the goal stack 205.

As stated earlier, inference engine device 106 selects rules to be put on the goal stack 205 from the goal pool. The goal pool is an unordered file created and stored in memory by inference engine device 106. Inference engine device 106 places into the goal pool sets of rule instances (a combination of the rule and the possible object bindings) that are not known to be false. The goal pool is the set of backward chaining rule instances that are eligible to be pursued.

A backward chaining rule instance is a rule with associated data items that the rule will eventually need to fire (if its testing during goal processing is successful). Inference engine device 106 also adds rule instances to the goal pool when objects that can be bound to the rule instance are asserted. Inference engine device 106 removes rule instances from the goal pool when either bound data items are retracted, the rule instance is fired, or the premise becomes false.

As shown by an operational block 314, inference engine device 106 first examines the goal stack 205 to determine whether any goals have been specified. Recall that when the system is first initialized, the goal stack 205 is empty. Goals in the first embodiment can only be inserted by inference engine device 106 into the goal stack 205 via firing a rule. As shown by an operation block 320, if no goal exists, inference engine device 106 terminates the host system (typically an expert system).

Assuming that a goal exists on the stack, inference engine device 106 instructs CPU 102 to perform the decisional operation as depicted by decisional block 316. As shown by decisional block 316, inference engine device 106 instructs CPU 102 to determine whether a value for the goal is known. If a value for the goal is known, inference engine device 106, as indicated by an operational block 328, instructs CPU 102 to distribute the object to the Rete network and to remove the goal from the goal stack 205.

At that point, the appropriate rule may become activated. Inference engine device 106 then instructs CPU 102 to perform the above action again. The above sequencing would be performed until a goal is reached and the value for it is unknown.

As shown by a decisional block 316, if inference engine device 106 detects a goal with an unknown value, it instructs CPS 102 to perform the operation indicated by a decisional block 322. As indicated by decisional block 322, inference engine device 106 instructs CPU 102 to examine the goal pool and determine if any rules exist that if activated will provide the desired object value. If the answer to decisional block is yes, then inference engine device 106 performs the operation of operational block 324. If the answer is no, then inference engine device 106 performs the operation of decisional block 326.

As shown by an operational block 324, inference engine device 106 instructs CPU 102 to collect all the rules that if activated will provide the desired object value. Inference engine device 106 also instructs CPU 102 to insert each of the rules onto goal stack 205 such that the set of rules is identifiable on the top of goal stack 205.

As shown by operational block 312, inference engine device 106 then instructs CPU 102 to once again examine the next item on the goal stack 205. This item will likely be a rule or set of rules. As shown by decisional blocks 314 and 318, inference engine device 106 instructs CPU 102 to select a rule from the set of rules on top of the stack (recall that each rule, if fired, will produce the value for the goal). This is called goal rule selection. Inference engine device 106 of the first embodiment selects goal rule instances in a similar process as conflict resolution:

1. Priority: select the rule instance with the highest priority.
2. Recency: select a rule instance with the most recently changed data bound to it. This is to focus processing on the most recent chain of reasoning.
3. Simplicity: select a rule that is most simple.

This is accomplished through two selection criteria:
   a. Select the goal rule instance with the least number of objects bound to it.
   b. Select the goal rule instance with the least number of condition tests.

It should be understood, however, that the above selection criteria can be modified to other priority orders and configurations. The selection chosen may be a function of the particular expert system employed.

Inference engine device 106 is designed this way so as to reduce the cost of backward chaining by forcing goal expansion to exert the least amount of effort in testing conditions and requesting sources. Inference engine device 106 only requests data that is absolutely needed. If, after the conflict resolution strategy is exhausted, there are still more than one rule instance selected, inference engine device 106 instructs CPU 102 to arbitrarily select one of the remaining rules.

As shown by decisional block 318, once a goal rule instance has been selected, inference engine device 106 instructs CPU 102 to activate (fire) the selected rule. Inference engine device 106 examines each object in the selected rule premise and determines whether a value for it is known. If inference engine device 106 finds an object with a value, it distributes the object through the Rete network branch associated with the goal rule instance. As is discussed below, in other embodiments of the present invention, inference engine device 106 may be examining a goal rule that contains backward chaining objects and forward chaining objects.

If the tests of the rule do not evaluate true during distribution and rule evaluation, the rule instance is removed from the goal pool and goal stack 205 by augmenting the Rete network. The inferencing cycle then resumes. At this point, alternative rules, if any, that can provide the value for the current goal may be selected.

In any event, it should be apparent that rule activation in the present invention happens as a side effect. When objects are distributed to the Rete network, rule instances may enter the conflict set 204. If inference engine device 106 detects the existence of a rule instance in the conflict set 204, it suspends backward chaining reasoning at that point and allows the rule to be activated. When a rule is activated, it is deleted from the goal stack 205.

If, however, a backward chaining object does not have a value, inference engine device 106 makes the unknown object a subgoal. Inference engine device 106 then instructs CPU 102 to place the subgoal onto the top of the goal stack 205.

As shown by operational block 312, inference engine device 106 then instructs CPU 102 to examine the next item on the stack. The next item on the stack is the subgoal.

The current subgoal now undergoes the same reasoning cycle as was performed on the prior goal. Thus, as indicated by decisional block 316, inference engine device 102 instructs CPU 102 to examine the subgoal and determine if it has a value.

As indicated by decisional block 316 and operational block 328, if the subgoal has a value, it is distributed to the Rete network branch associated with the selected goal rule instance only.

As indicated by decisional block 316 and 326, if the subgoal does not have a value, inference engine device 106 instructs CPU 102 to examine the goal pool and determine if any rules exist that would provide a value for the subgoal.

If inference engine device 106 detects that no rules are available to provide the data value, and the data value has been defined with an external source, it then requests the source. This feature is important when, for example, the expert system developer knows that asking the end user is easier than having the system execute the internal compilation.

As depicted by operational block 328, if the source gives the value, inference engine device 106 then instructs CPU 102 to distribute the object to the associated rule in the Rete network.

As depicted by operational block 330, if inference engine device 106 finds no external source specified with the object, or the source fails to return a value, then the object (subgoal) and all rules that reference it are removed from the goal stack 205. Inference engine 106 then resumes its cycle either selecting an alternative goal or terminating if no more goals are present.

If all objects needed by the goal rule instance's premise exist and have values such that the premise tests true, then backward chaining objects whose values are needed in the rule's actions but are not referenced in the rule's premise are checked for values. If such data items (objects) do not have values, then they become subgoals.

Once all required backward chaining data items have values and all conditions are tested as true, then, as a natural action of Rete network processing, the goal rule instance enters the conflict set 204 as the only rule instance in the conflict set 204. Upon detection by inferencing engine device 106 of rules instances in the conflict set 204, it performs conflict resolution.

Upon selection of a rule, inference engine device 106 then fires the rule. Upon firing, inference engine device 106 deletes its rule instances in the goal stack 205 and goal pool.

When inference engine device 106 detects that no more goals (if no goals then therefore no rules) exist in the goal stack 205 and no rule instances, it terminates reasoning. It is contemplated, however, that inference engine device 106 may ask the user for a new goal.

The following is an example demonstrating the above described operation of inference engine device 106. It is merely for purposes of illustration, and should not be construed to limit the scope of the invention.

Assume the expert system developer designs a system to determine the outdoor temperature. A simple knowledge base may consist of the following:

Rules:
Rule 1.0 If START then (TEMPERATURE)
Rule 2.0 If THERMOMETER is available then TEMPERATURE = thermometer reading
Rule 3.0 If WEATHER is snowing then TEMPERATURE = 32
Rule 4.0 If SKY is blue then WEATHER = clear
Rule 5.0 If SKY is green then WEATHER = snowing In addition, the system developer has designated objects TEMPERATURE, THERMOMETER, SKY as backward chaining objects. The system developer has also specified that the objects, TEMPERATURE and THERMOMETER must be obtained internally. In contrast, the system developer has specified the value for object SKY must be obtained from the expert system user.

Referring back to FIG. 3 and as depicted by operational block 304, when the system is first initialized, inference engine device 106 instructs CPU 102 to examine the knowledge base. As a result, CPU 102 places Rules 1.0-5.0 into the goal pool.

As depicted by operational block 306, inference engine device 106 instructs CPU 102 to distribute any objects using forward chaining reasoning to the Rete network. In the present example, only the object START is distributed. As a result of the object START being distributed to the Rete network, a match occurs in rule 1.0. Thus, rule 1.0 appears in the conflict set.

Figure 4:
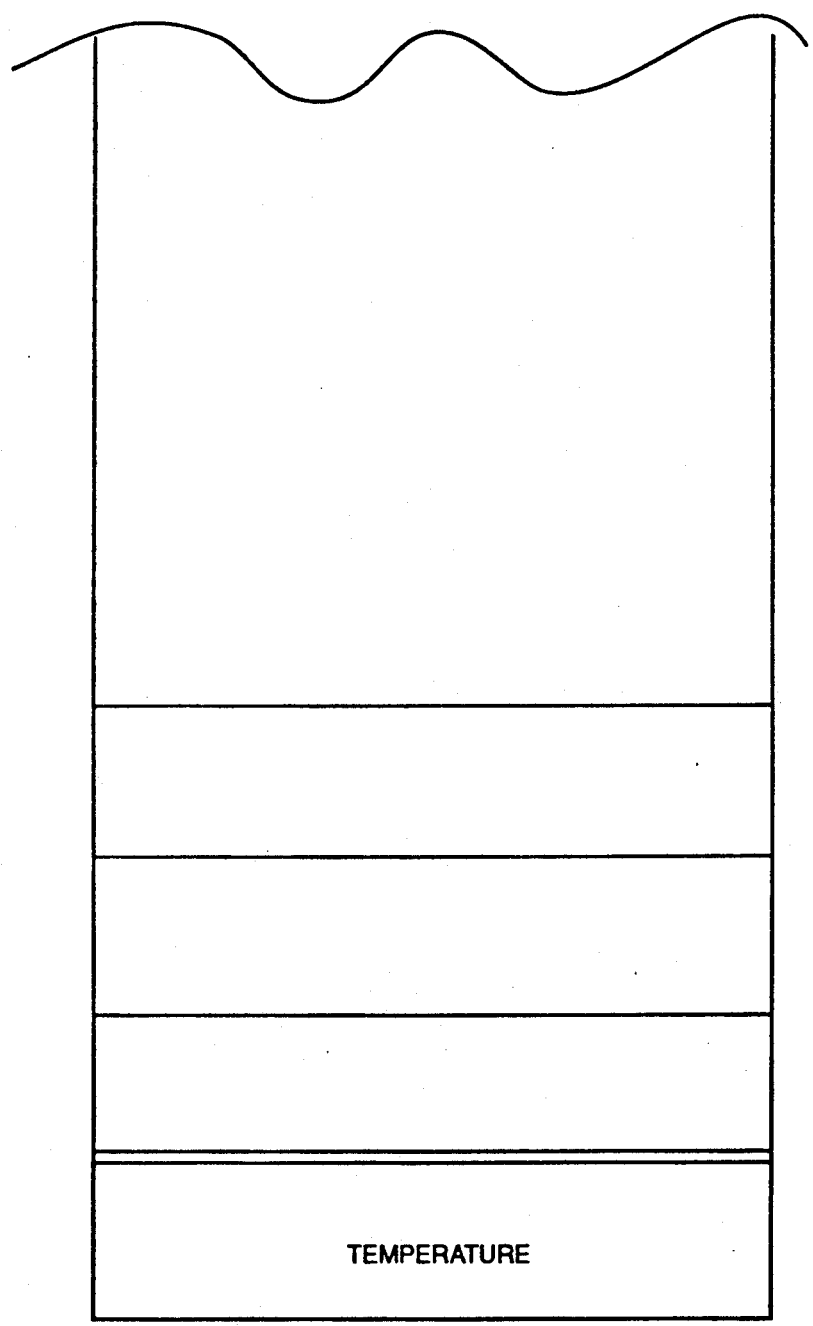
FIG. 4 is a pictorial illustration showing the initial "state" of the goal stack 205 of the present invention during backward chaining reasoning.

As shown by decisional block 308, inference engine device 106 instructs CPU to examine if any rules exist in the conflict set 204. Because rule 1.0 exists in the conflict set 204, inference engine device 106 instructs CPU 102 to select and fire the rule (its the only rule in the conflict set). Upon activation of the rule, inferencing engine device 106 places object TEMPERATURE (in the preferred embodiment this is the only way of specifying a goal) as the first goal on the goal stack 205. The resultant state of the goal stack 205 is shown in FIG. 4. As shown, the object TEMPERATURE is the only item in the goal stack 205.

Inferencing engine device 106 resumes the above cycle. As indicated by decisional block 308, because no more rules exist in the conflict set, control passes to operational block 312. As indicated by operational block 312, inference engine device 106 instructs CPU 102 to process the top item in the goal stack 205. This item is the goal TEMPERATURE.

As shown by decisional block 314, inference engine 106 instructs CPU 102 to determine whether the item is a goal or a rule. Because the top item is a goal, control is passed to decisional block 316.

As shown by decisional block 316, inference engine device 106 instructs CPU 102 to determine whether a value is known for goal TEMPERATURE. In our example, the value for TEMPERATURE is unknown. As a result of this determination and decisional block 322, inference engine device 106 instructs CPU 102 to examine the goal pool to determine if a rules or rules exist that, if fired, would provide the value for TEMPERATURE. In our example, CPU 102 would answer yes to this question, because rules 2.0 and 3.0 would provide a value for TEMPERATURE.

Figure 5:
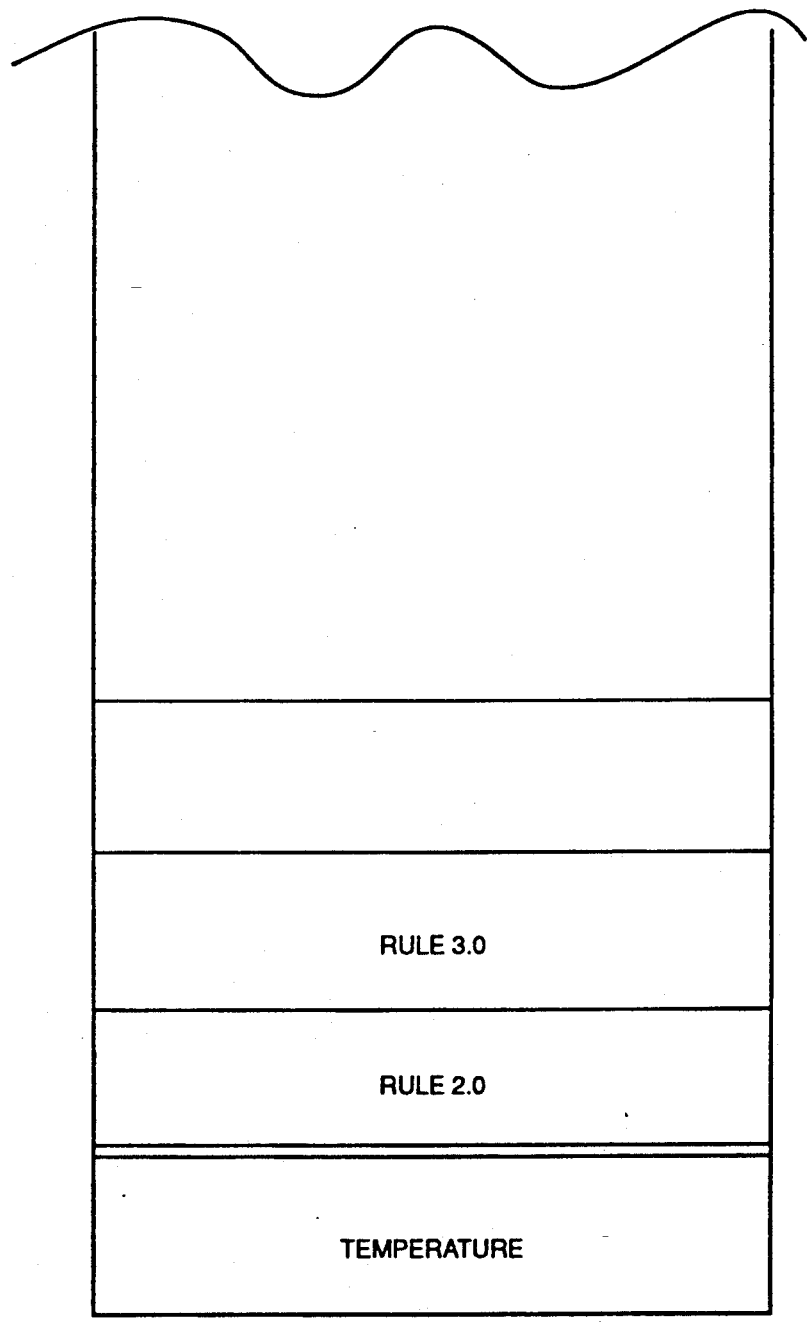
FIG. 5 is a pictorial illustration showing an intermediate "state" of the goal stack 205 of the present invention during backward chaining reasoning.

As shown by operational block 324, inference engine device 106 then instructs CPU 102 to add rules 2.0 and 3.0 to the goal stack 205. The resultant state of the goal stack 205 is illustrated in FIG. 5. Control is returned to operational block 312.

As shown by operational block 312, inference engine device 106 now instructs CPU to select the next item on the goal stack 205: either rule 2.0 or 3.0. Inference engine device 106 instructs CPU 102 to select rule 3.0 based on the selection criteria discussed earlier. Control now returns to decisional block 314.

As shown by decisional block 314, CPU 102 determines that the new item on the stack is a rule and passes control to operational block 318. As shown by operational block 318, inference engine device 106 instructs CPU 102 to examine each of the objects in the rule premise of rule 3.0. As CPU examines each object, it determines whether a value is known for the object. If a value is known for the object, it is distributed to the Rete network. If no value is known, the object is placed on the goal stack 205.

Figure 6:
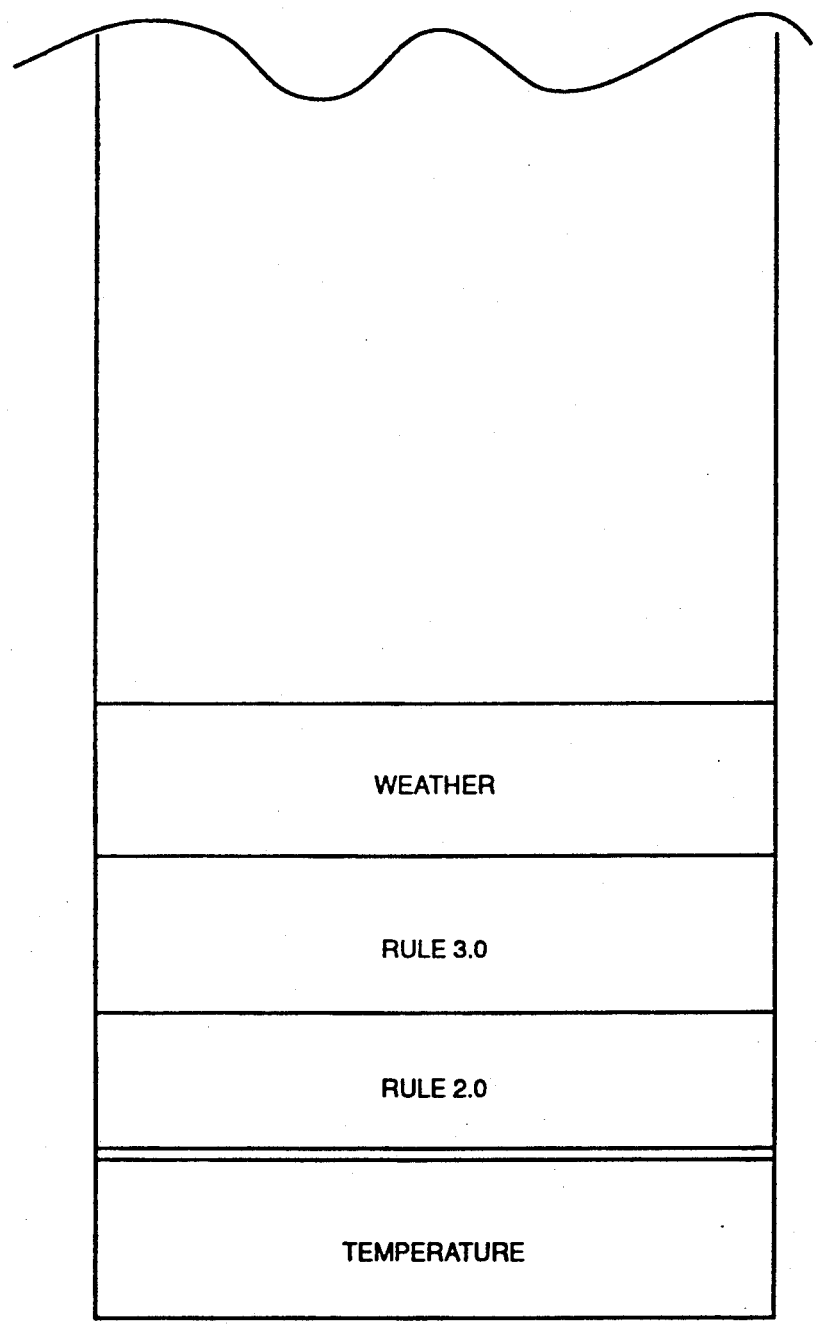
FIG. 6 is a pictorial illustration showing an intermediate "state" of the goal stack 205 of the present invention during backward chaining reasoning.

In our example, rule 2.0 has only one object: WEATHER. As indicated by operational block 332, inference engine device 106 determines that the value for WEATHER is unknown and places the object WEATHER on the goal stack 205. The object WEATHER is now the subgoal. Control is then returned once again to operational block 312. The resultant state of the goal stack 205 is as shown in FIG. 6.

As shown by operation block 312 and decisional block 314, inference engine device 106 now determines that the next item on the goal stack 205 is a sub-goal (WEATHER) for which a value is unknown. Control is passed to decisional block 322 wherein inference engine device 106 instructs CPU 102 to examine the goal pool to determine whether any rules exist that, if fired, will provide a value for WEATHER: any value will suffice.

Figure 7:
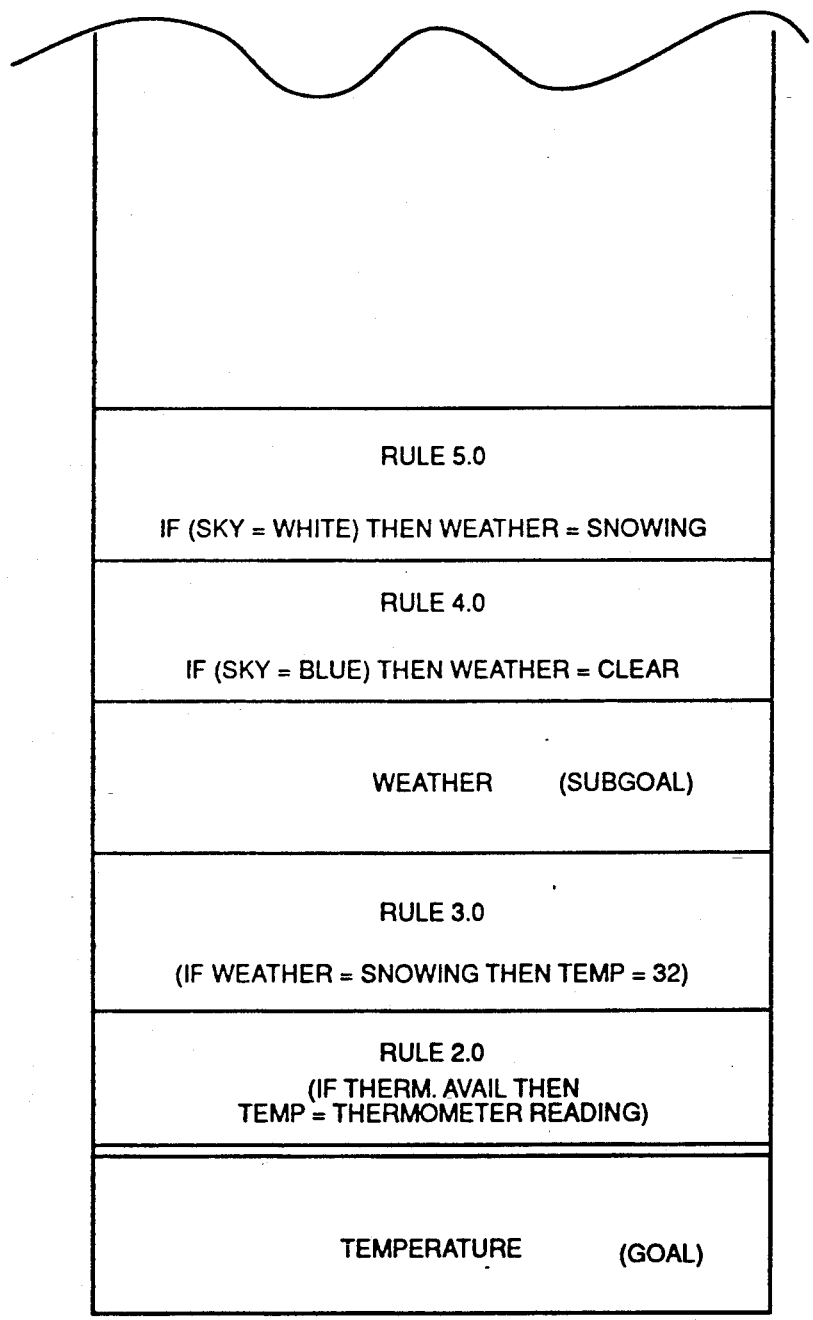
FIG. 7 is a pictorial illustration showing an intermediate "state" of the goal stack 205 of the present invention during backward chaining reasoning.

In the present example, rules 4.0 and 5.0, if fired, would provide a value for WEATHER. Therefore, as shown by operational block 324, inference engine device 106 instructs CPU 102 to add rules 4.0 and 5.0 to the goal stack 205. Control once again returns to operational block 314. The resultant state of the goal stack 205 is now as shown in FIG. 7.

As shown by operational block 312, inference engine device 106 now instructs CPU 102 to select the next item on the goal stack 205: either rule 4.0 or 5.0. Assume inference engine device 106 instructs CPU 102 to select rule 4.0 based on the selection criteria discussed earlier. Control now returns to decisional block 314.

As shown by decisional block 314, CPU 102 determines that the new item on the stack is a rule and passes control to operational block 318. As shown by operational block 318, inference engine device 106 instructs CPU 102 to examine each of the objects in the premise of rule 4.0. As CPU 102 examines each object, it determines whether a value is known for the object. If a value is known for the object, it is distributed to the Rete network. If no value is known, the object is placed on the goal stack 205.

Figure 8:
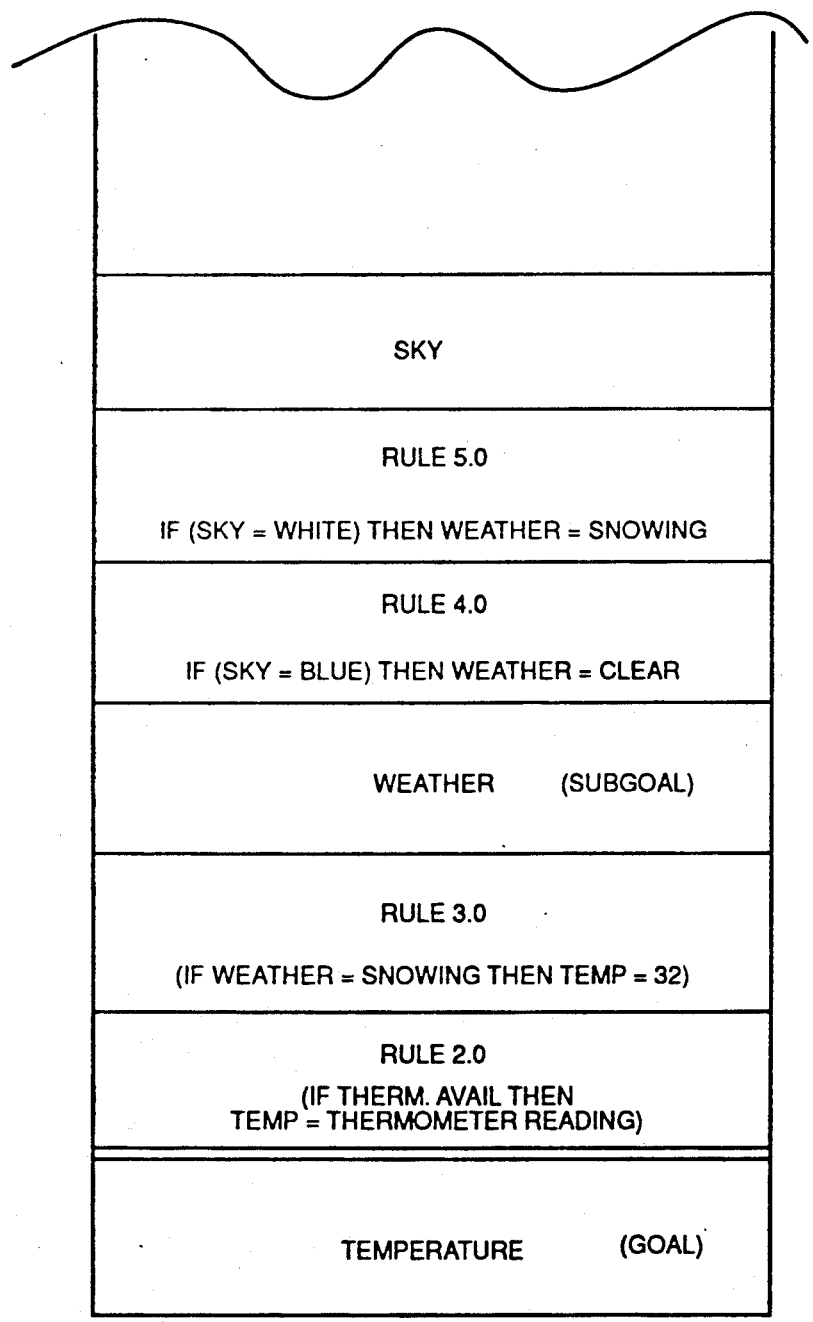
FIG. 8 is a pictorial illustration showing an intermediate "state" of the goal stack 205 of the present invention during backward chaining reasoning.

In our example, rule 4.0 has only one object: SKY. Inference engine device 106 determines that the value for the object SKY is unknown and places the object SKY on the goal stack 205. The object SKY is now the subgoal. Control is then returned once again to operational block 312. The resultant state of the goal stack 205 is as shown in FIG. 8.

As shown by operation block 312, decisional block 314, inference engine device 106 now determines that the next item on the goal stack 205 is a sub-goal (SKY) for which a value is unknown. Control is passed to decisional block 322 wherein inference engine device 106 instructs CPU 102 to examine the goal pool to determine whether any rules exist that, if fired, will provide a value for the object SKY.

In our example, there are no rules in the goal that can provide a value for SKY. As a result thereof control passes to decisional block 326. As shown by decisional block 326, inference engine device 106 instructs CPU 102 to decide whether the user has allowed the object SKY to be obtained by an external source (such as the user). In our example, the object SKY was designated by the expert system developer to obtained by an external source. Thus, control is passed to operational block 326. If a value for the object could not be obtained, control would pass to operational block 330 where the object SKY and the associated rule (rule 4.0 and not rule 5.0) would be deleted from the goal stack 205.

As shown by operational block 327, inference engine device 106 instructs CPU 102 to prompt the user for a value for the object (subgoal) sky. Assume the user enters the value green for the object sky. At this point, the object sky has a value of green. Control passes to operational block 328.

As shown by operational block 328, the object SKY with its associated value of green is selectively distributed to only rule 4.0 of the rete network. However, the object shy with a value of green does not match rule 4.0. In other words, the object sky with a value of green test false.

Figure 9:
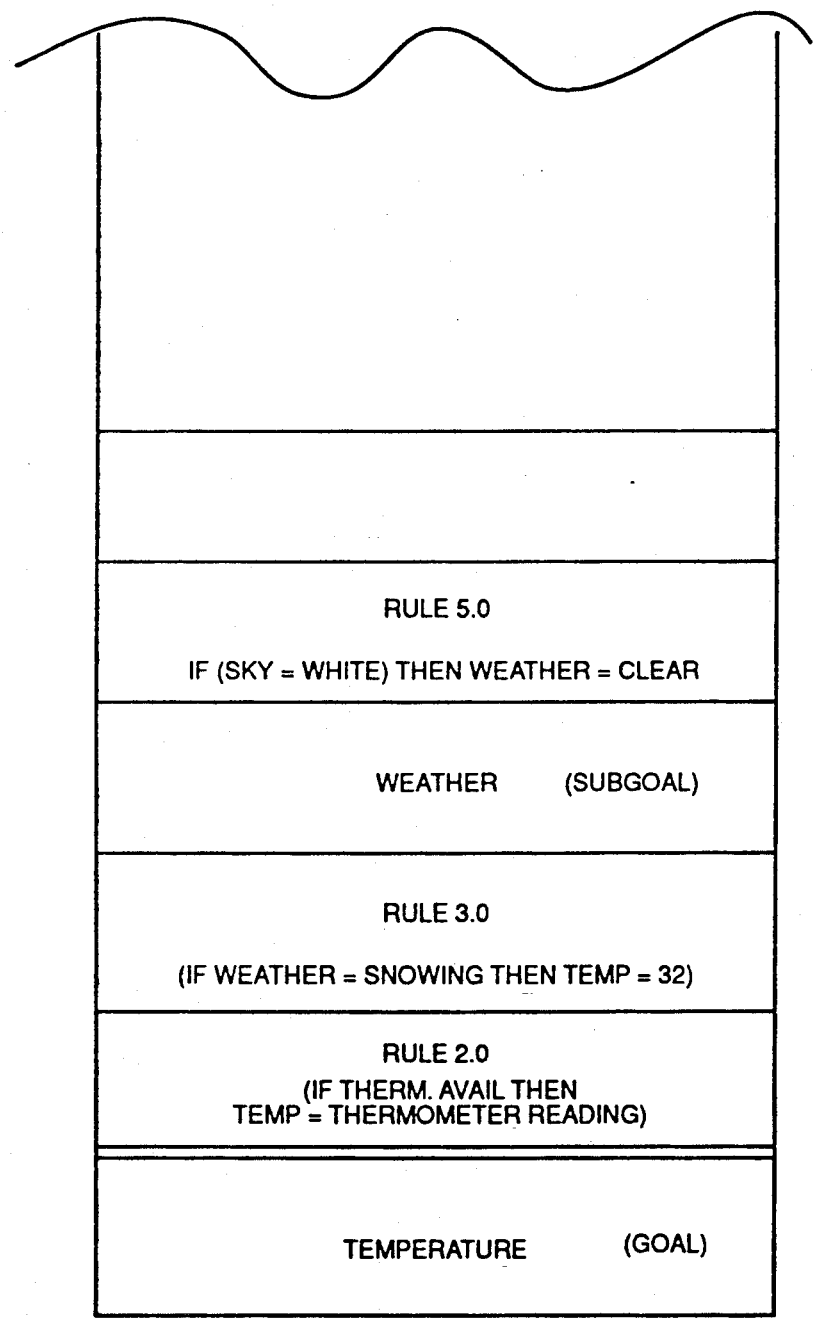
FIG. 9 is a pictorial illustration showing an intermediate "state" of the goal stack 205 of the present invention during backward chaining reasoning.

As a result of this, inference engine 106 instructs CPU 102 to delete the object sky from the goal stack 205. In addition, inference engine 106 instructs CPU 102 to delete there rules associated with only that object (i.e. rule 4.0 and not rule 5.0). In other words, the premise of rule 4.0 is false. It should be understood, however, that the next time the expert application is run, rule 4.0 may be true (i.e. the external source may enter a value of blue for the object SKY). The above feature is a significant attribute of the present invention. The resultant state of the goal stack 205 is shown in FIG. 9. Control now returns directly to operational block 312.

As indicated by operational block 312, inference engine 106 instructs CPU 102 to examine the goal stack 205 for the next item. Thereafter, as shown by decisional block 314, inference engine device 106 determines that the new item on the stack is rule 5.0, and passes control to operational block 318.

As shown by operational block 318, inference engine device 106 instructs CPU 102 to examine each of the objects in the premise of rule 5.0. As CPU 102 examines each object, it determines whether a value is known for the object. If a value is known for the object, it is distributed to the Rete network. If no value is known, the object is placed on the goal stack 205.

Figure 10:
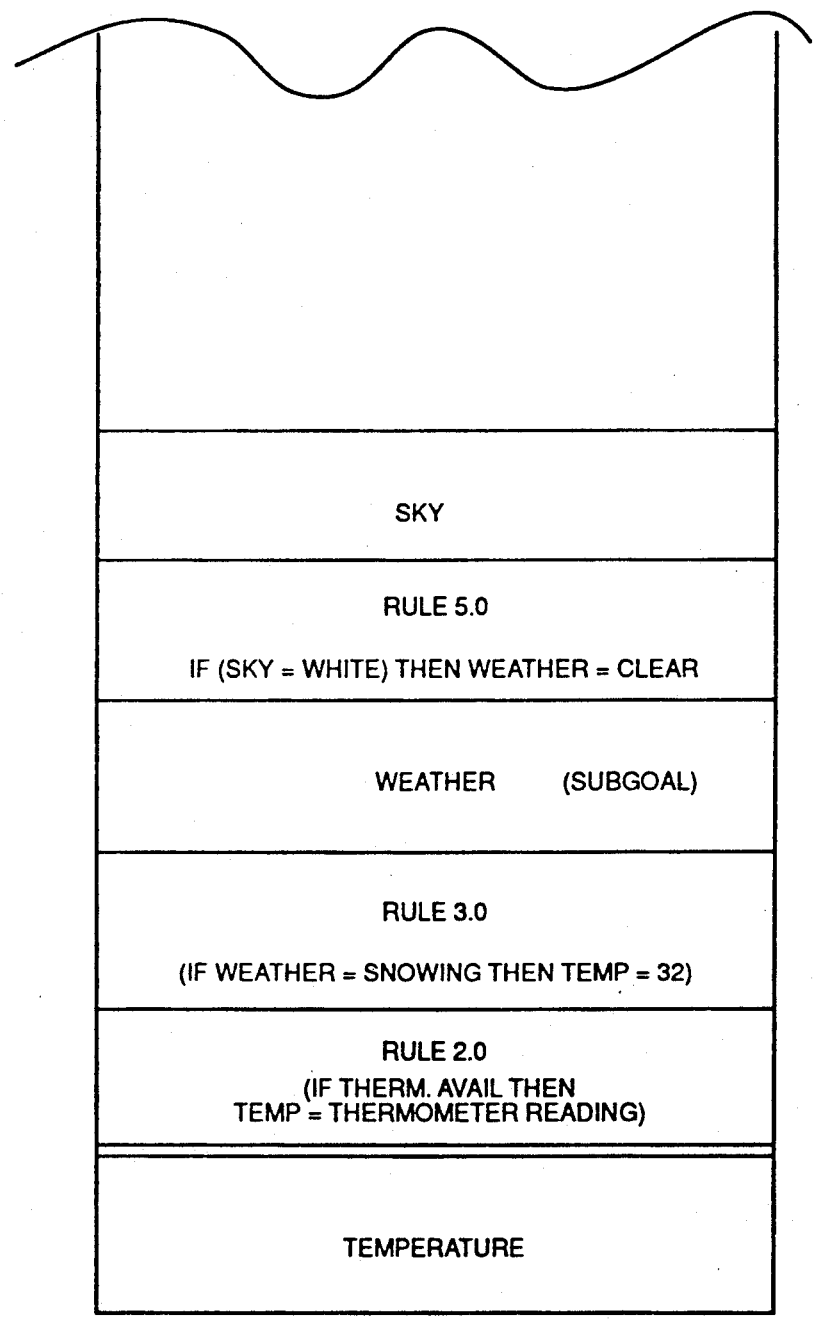
FIG. 10 is a pictorial illustration showing an intermediate "state" of the goal stack 205 of the present invention during backward chaining reasoning.

In the present example, rule 5.0 has only one object: SKY. Inference engine device 106 determines that the value for SKY is unknown and places the object SKY on the goal stack 205. The object SKY is now the current subgoal. Control is then returned once again to operational block 312. The resultant state of the goal stack 205 is as shown in FIG. 10.

Thereafter control is passed to decisional block 316. As shown by decisional block 316, inference engine device 106 instructs CPU 102 to examine the knowledge base and determine whether a value for the object SKY is known.

In our example, the user has previously entered a value for the object sky. That value was green. Thus the system does have a value for the object (in any case it may be efficient to prompt the user for the value of the same object once again). Control passes to operational block 328.

As shown by operational block 328, the object sky with its associated value of green is selectively distributed to only rule 5.0 of the rete network. As shown by decisional block 308, inference engine device 106 then determines that a rule can fire (rule 5.0).

As shown by operational block 309, inference engine device 106 selects rule 5.0 (the only rule in the conflict set). As shown by operational block 310, inference engine device 106 activates the rule. The firing of the rule assigns a value (snowing) to the backward chaining object WEATHER.

Figure 11:
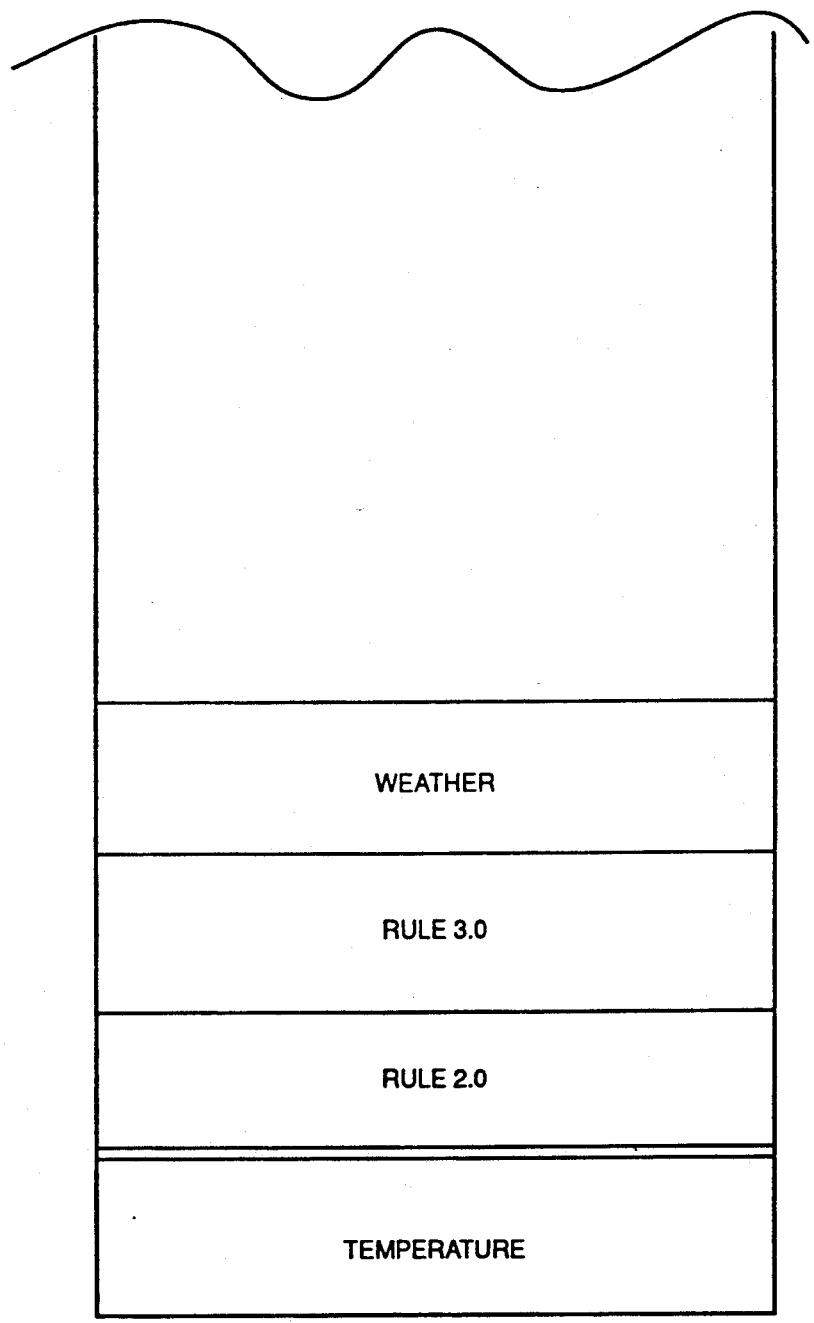
FIG. 11 is a pictorial illustration showing an intermediate "state" of the goal stack 205 of the present invention during backward chaining reasoning.

Because the object was designated backward chaining by the system developer, it has not been distributed to the Rete network. In addition, and also as a result of the firing of rule, inference engine device 106 instructs CPU 102 to remove the subgoal SKY and its associated rule (rule 5.0 P) from the goal stack 205. The resultant state of the goal stack 205 is as illustrated in FIG. 11.

Because no rules are present in the conflict set, inference engine device 106 resumes backward reasoning.

As a result, inference engine device 106 instructs CPU 102 to process the next item in the goal stack 205. This item is the goal WEATHER. As shown by decisional block 314, CPU 102 then determines whether a value is known for subgoal WEATHER. In our example, the value for WEATHER is known (it was just created by the firing of rule 5.0).

As shown in operational block 328, inference engine device 106 instructs CPU 102 to distribute the object WEATHER to the appropriate referenced rule (rule 3.0). As shown by decisional block 308, inference engine device 106 then determines that a rule can fire (rule 3.0) and activates the rule.

Figure 12:
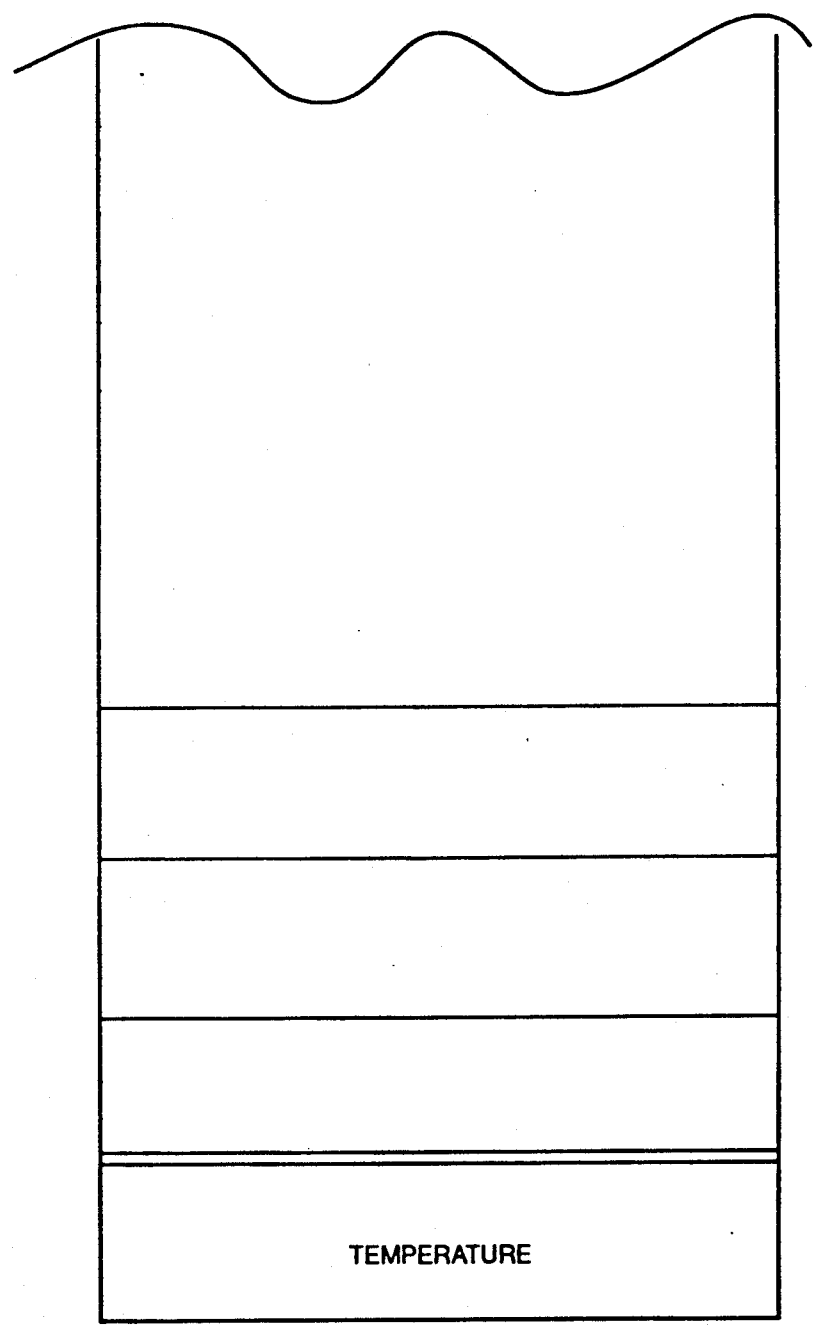
FIG. 12 is a pictorial illustration showing the final "state" of the goal stack 205 of the present invention during backward chaining reasoning.

The firing of rule 3.0 assigns a value to the backward chaining object TEMPERATURE. Because the object is backward chaining it is not as yet distributed to the Rete network. In addition, as a result of the firing of the rule, inference engine device 106 instructs CPU 102 to remove the subgoal TEMPERATURE and all rules that reference the object TEMPERATURE (2.0 and 3.0) from the goal stack 205. The resultant state of the goal stack 205 is as illustrated in FIG. 12. Because no more rules exist in the conflict set, inference engine device 106 resumes backward reasoning.

As a result, inference engine device 106 instructs CPU 102 to process the next item in the goal stack 205. This item is the goal TEMPERATURE. As you may recall, this was the original goal declared by the system developer. As shown by decisional block 314, CPU 102 then determines whether a value is known for subgoal TEMPERATURE. In our example, the value for TEMPERATURE is known (it was just created by the firing of rule 3.0).

As shown in operational block 328, inference engine device 106 instructs CPU 102 to selectively distribute the object TEMPERATURE to the appropriate referenced rule, which in our example may be a PRINT rule to screen. As shown by decisional block 308, inference engine device 106 then determines that the rule can fire and activates the rule.

The firing of the rule may transmit the value of TEMPERATURE to the user via input/output device 116. As a result of the firing of the rule, inference engine device 106 instructs CPU 102 to remove the goal TEMPERATURE and any associated rules (no rules exist because TEMPERATURE was the original goal on the goal stack 205). The goal stack 205 is now empty.

Control is then passed to operational block 312 and decisional block 314, where the inference engine device 106 determines that no other items exist on the goal stack 205. As a result of this, inference engine device 106 terminates the expert system operation.

It should be readily observed that had the object WEATHER been assigned the value of clear (which would have occurred if the user entered a value of blue for the object SKY), then the value of WEATHER would not match rule 3.0. The result of this would be the deletion of the object WEATHER and its associated rule 3.0. Note that the object WEATHER and rule 3.0 is a good heuristic to getting an approximate value for temperature, although maybe not the best value or as an accurate value as would be using a thermometer.

The first and second embodiments of the present invention will now be described. It should be understood, however, that the reasoning cycle of the first embodiment described above is equally applicable to the second and third embodiments described below.

B. Second Embodiment

Just as it is possible to have rules that only perform forward chaining reasoning and rules that only perform backward chaining reasoning in the present invention, it is possible to mix forward and backward chaining reasoning within the same rule. If a rule uses both forward and backward chaining reasoning in its premise, then the rule is a backward chaining rule, and enters the goal pool. Once such a rule instance is selected by inference engine device 106 as the goal rule instance, it proceeds through the normal goal expansion processes.

If any bound objects cause a condition to test false, condition testing and goal expansion is immediately suspended (such that further expansion and distribution will not take place) and the rule instance is removed from the goal stack 205. Otherwise the rule instance will enter the conflict set.

With mixed chaining reasoning in the present invention, there are a few subtle nuances to consider:

1) If, after the rule instance has been fully expanded, either more instances of objects used in forward chaining reasoning are created or known forward chaining objects have value changes that cause the rule premise to evaluate true, then the rule instance will refire as part of the normal forward chaining process, since all objects used in backward chaining reasoning have been distributed.

2) If a backward chaining rule instance distributes all its objects using backward chaining reasoning, but cannot fire because an object using forward chaining reasoning causes a condition to test false, the rule instance will not fire. However, since all objects using backward chaining reasoning have been distributed, if objects using forward chaining reasoning are either created or modified such that the rule premise can be evaluated true, then the rule instance will fire as part of the normal forward chaining process. This usually happens when the rule references objects using forward chaining reasoning as its last condition.

C. Third Embodiment

In the first and second embodiments, objects using backward chaining reasoning were only distributed to the specific condition of the rule that reasoned about that object. In the third embodiment, however, objects using backward reasoning can be distributed through the Rete network as though they were using forward chaining reasoning. If such an object does not have a value, it will be processed through goal expansion, delaying pursuit of a value for the object until a value is needed. However, once it has a value, it will be fully distributed throughout the Rete network, as though forward chaining reasoning were being used. All further value changes will also be fully distributed. This allows rules to fire "opportunistically" as soon as their tests become true without regard to the focus of backward chaining. Therefore it is possible for a backward chaining rule that references objects using backward chaining reasoning to fire as part of forward chaining once the backward chaining objects have values.

In the three embodiments of the present invention described above, objects are tagged such that they are used by backward chaining and forward chaining rules. By way of example only, three objects which make up a given rule could be declared by the system developer as "backward chaining objects" and thus that rule, which references only those objects, will perform backward chaining reasoning using these objects. The same could be constructed such that rules reason only in a forward chaining manner. This reasoning is that contemplated by the first embodiment.

On the other hand, two objects which make up a given rule may be declared such that one object is a forward chaining object and the other a backward chaining object. This configuration declared by the system developer allows a rule to reason in both a forward chaining manner and a backward chaining manner. This reasoning is that contemplated by the second embodiment.

In addition, to be declared forward chaining objects or backward chaining objects, the objects may also be tagged such that their distribution is to the entire Rete network. This feature of the present invention allows opportunistic reasoning to occur.

It should be understood, however, that objects need not be declared forward chaining or backward chaining. By way of example only, the present invention contemplates tagging rules instead of tagging objects. As will be appreciated by those skilled in the art, the above feature of tagging objects is only an implementation detail. Other implementation schemes may be easily developed.

D. Alternative embodiments

It is also contemplated that inference engine device 106 will allow the specification of a particular value, set of values, or pattern to pursue, instead of obtaining any value. This feature relates to improved pattern matching. In other words, the ability to seek specific values for objects.

It is also contemplated that the system developer could explicitly specify a goal to be retracted from the goal stack 205. The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. An inference engine device adapted for use in a computer-controlled expert system, the computer-controlled expert system having a computer and a knowledge base of objects and rules, the objects having known values and unknown values, the rules having at least one test against an object or objects, which inference engine device comprising:
   a) first means for storing instructions for the computer;
   b) second means, associated with said first means, for instructing the computer to perform forward reasoning with the objects having known values using the rules configured in a Rete based network, said second means comprising means for generating a conflict set;
   c) third means, associated with said first means, for instructing the computer to perform backward reasoning using the rules about the objects having unknown values; and
   d) fourth means, associated with said first means, for controlling the execution of said second means and said third means.

2. The inference engine device of claim 1, wherein said fourth means further comprises means for initiating backward reasoning when no rules are present in the conflict set.

3. The inference engine device of claim 2, wherein said fourth means comprises means for initiating forward reasoning upon detection of a rule in the conflict set.

4. The inference engine device of claim 3, wherein said second means further comprises means for distributing the objects having known values to the Rete based network.

5. The inference engine device of claim 4, wherein said third means comprise a goal stack for storing a goal, said goal being at least one of the objects having unknown values.

6. The inference engine device of claim 5, wherein said objects having unknown values may be obtained by either an external source or by selecting a rule with an associated action that will provide a value for said goal and adding said selected rule to said goal stack.

7. The inference engine device of claim 6, wherein said third means further comprise means for selecting said selected rule from said goal stack and means for evaluating said selected rule.

8. The inference engine device of claim 7, wherein said evaluation means comprise means for examining each test of the rule and determining whether a referenced object in a premise is known.

9. The inference engine device of claim 8, wherein said evaluation means further comprises means for placing said referenced object on said goal stack if said premise is unknown.

10. The inference engine device of claim 9, wherein said third means further comprises means for selectively distributing said referenced object to the rule in the Rete based network.

11. The inference engine device of claim 9, wherein said third means further comprises means for distributing said referenced object to the Rete based network.

12. The inference engine device of claim 5 further comprising fifth means for retracting said goal and one of the rules associated with said goal from said goal stack.

13. The inference engine device of claim 12, wherein said fifth means comprises:
   (1) means for detecting when a known object does not satisfy a rule; and
   (2) means for deleting said known object and its associated rule from said goal stack and a goal pool.

14. A computer-controlled method for reasoning about a knowledge base of an expert system, the knowledge base having objects and rules therein, which method comprises the steps of:
   (a) performing forward reasoning on the objects to generate a conflict set of rule instances using the rules configured in a Rete based network;
   (b) continuing forward reasoning using the rules until no said rule instances exist in the conflict set; and
   (c) performing backward chaining using the rules on the objects when no said rule instances exist in the conflict set.

15. The computer-controlled method of claim 14, wherein step (c) comprises the steps of:
   (1) generating a set of desired object values (goals) and rules that have actions that provide the desired object values;
   (2) selecting one of said rules and one of said desired object values from said set;
   (3) updating said set in order to obtain a value for said selected desired object value; and
   (4) selectively distributing a known object value to said rules for matching.

16. The computer-controlled method of claim 15, wherein step (a) comprises the steps of:
   (1) detecting when said selectively distributed known object does not match its associated rule; and
   (2) deleting the goal corresponding to said selectively distributed known object and its associated rule from said set.

17. A computer-controlled inference engine adapted for reasoning about a knowledge base of an expert system, the knowledge base having objects and rules therein, the rules having first condition tests and second condition tests, which computer-controlled inference engine comprises:
   (a) first means for reasoning in a forward or backward chaining manner using the rules, wherein the rules are configured in a Rete based network;
   (b) second means for reasoning in a forward chaining manner with one or more of the first condition tests of one of the rules; and
   (c) third means for reasoning in a backward manner with one or more of the second condition tests of the same rule.

18. A computer-controlled inference engine adapted for reasoning about a knowledge base of an expert system, the knowledge base having objects and rules therein, the rules having at least one condition test, which computer-controlled inference engine comprises:

(a) first means for acquiring object values so that the expert system can reason in a forward chaining manner with all the rules, wherein the rules are configured in a Rete based network;

(b) second means for reasoning in a backward chaining manner with one or more of the rules to acquire object values; and (c) third means for forward chaining reasoning with all the rules using said object values.

* * * * *